(12) United States Patent
Shiozawa

(10) Patent No.: US 7,616,581 B2
(45) Date of Patent: Nov. 10, 2009

(54) PATH SETUP UNIT, PATH SETUP SYSTEM AND PATH SETUP METHOD THEREFOR

(75) Inventor: Kenichi Shiozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 950 days.

(21) Appl. No.: 11/240,603

(22) Filed: Oct. 3, 2005

(65) Prior Publication Data
US 2006/0072471 A1    Apr. 6, 2006

(30) Foreign Application Priority Data
Oct. 4, 2004    (JP) .............................. 2004-291247

(51) Int. Cl.
*H04L 12/26* (2006.01)
(52) U.S. Cl. .................................... 370/248
(58) Field of Classification Search ........................ None
See application file for complete search history.

(56) References Cited

U.S. PATENT DOCUMENTS 5,781,537 A * 7/1998 Ramaswami et al. ........ 370/254
6,658,001 B1 * 12/2003 Furuno et al. ............... 370/392
7,079,483 B2 * 7/2006 Yamada et al. .............. 370/222
7,436,855 B2 * 10/2008 Lee et al. .................... 370/471
2002/0191592 A1 * 12/2002 Rogers et al. ............... 370/352
2005/0025058 A1 * 2/2005 Chaudhuri et al. .......... 370/238
2005/0198312 A1 * 9/2005 Ashwood-Smith et al. .. 709/228

FOREIGN PATENT DOCUMENTS

| JP | 9-149045 A | 6/1997 |
|---|---|---|
| JP | 10-336194 A | 12/1998 |

* cited by examiner

*Primary Examiner*—Anh-Vu Ly
(74) *Attorney, Agent, or Firm*—Sughrue Mion, PLLC

(57) ABSTRACT

A path setup unit, path setup system and path setup method comprises; a plurality of NEs (Network Elements) which constitute a network and to which path setup is possible; a path setup unit which inputs, into the NEs, control information for performing any one of path setup, deletion and alteration at a scheduled date and time; and a control unit, of each of the NEs, which performs path setup at the scheduled date and time based on the control information.

16 Claims, 14 Drawing Sheets

| SCHEDULED DATE AND TIME | SETTING INFORMATION |
|---|---|
| 2003/07/29 00:45 | [BREAK/TEARDOWN]<br>INTERFACE INDEX = 0102<br>INTERFACE TYPE = SONET<br>INTERFACE CLOCK =<br>... |
| 2003/07/29 00:50 | [SETUP]<br>INTERFACE INDEX = 0103<br>INTERFACE TYPE = SONET<br>INTERFACE CLOCK =<br>... |
| 2003/07/29 01:00 | [SETUP]<br>INTERFACE INDEX = 0100<br>INTERFACE TYPE = SONET<br>INTERFACE CLOCK =<br>... |
| 2003/07/29 02:00 | [BREAK /TEARDOWN]<br>INTERFACE INDEX = 0103<br>INTERFACE TYPE = SONET<br>INTERFACE CLOCK =<br>... |
| ... | ... |
| ... | ... |

FIG.4

| INTERFACE | | | | | | | | | | | | | 0 | | | | | | | | | | | | | | | | | | 4 | | | |
|---|---|---|---|---|---|---|---|---|---|---|---|---|---|---|---|---|---|---|---|---|---|---|---|---|---|---|---|---|---|---|---|---|---|---|
| PORT | | | | 0 | | | | | | | | | | | | 7 | | | | | | | | | | ... | | | | 0 | | | ... |
| TIMESLOT | 0 | 1 | 2 | 3 | ... | 22 | 23 | 24 | ... | 0 | 24 | ... | 0 | 24 | ... | 0 | 24 | ... | 0 | 24 | ... | 0 | 24 | ... | 0 | 24 | ... | 0 | 24 | ... |
| DATE AND TIME | | | | | | | | | | | | | | | | | | | | | | | | | | | | | | | | | | |
| 2005/08/15 12:00 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2005/08/15 12:10 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2005/08/15 12:15 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2005/08/15 12:40 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2005/08/15 13:00 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2005/08/15 13:00 | 1 | 1 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 2005/08/15 14:00 | 1 | 1 | 1 | 1 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 2005/08/15 15:00 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 |
| 2005/08/15 15:01 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 2005/08/15 15:10 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 2005/08/15 15:12 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 2005/08/15 15:13 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 2005/08/15 15:14 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| 2005/08/15 15:15 | 0 | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 |
| ... | | | | | | | | | | | | | | | | | | | | | | | | | | | | | | |

FIG.5

| SETTING INFORMATION ID/PATH ID | STARTING DATE AND TIME | TASK ID | SETTING INFORMATION |
|---|---|---|---|
| 1003 | 2003/07/29 00:45 | 0001 | REGISTER INTERFACE 0103 INTO SYSTEM |
| | | 0002 | REGISTER PORT 0002 INTO SYSTEM |
| | 2003/07/29 00:48 | 0003 | INITIALIZE AND TEST INTERFACE 0103 |
| | | 0004 | INITIALIZE AND TEST PORT 0002 |
| | | 0005 | [SETUP]<br>INTERFACE INDEX = 0103<br>PORT INDEX = 0002<br>INTERFACE TYPE = SONET<br>INTERFACE CLOCK =<br>: |
| ⋮ | ⋮ | ⋮ | ⋮ |

FIG.6

PATH SETUP UNIT, PATH SETUP SYSTEM AND PATH SETUP METHOD THEREFOR

BACKGROUND OF THE INVENTION

1. Field of the Invention

The present invention relates to a path setup system and a path setup method, in a network composed of a Network Management System (NMS) and Network Elements (NEs) under command of the NMS, using Terminal Control equipment (TC), an Element Management System (EMS) and a control unit of each of the NEs.

2. Description of Related Art

Path setup at a scheduled date and time is a function by which a path is automatically set up when it becomes the scheduled date and time. Conventionally, this scheduled-date-and-time path setup function has been realized as a function of an NMS (Japanese Patent Application Laid-open No. Hei10-336194 and Japanese Patent Application Laid-open No. Hei09-149045). In normal path setup, the NMS performs, on each NE on a route of the path, a control required for the path setup immediately after a network operator inputs a command for the path setup. In scheduled-date-and-time path setup of a conventional method, the NMS does not perform the control on each NE immediately after the command is inputted, but performs it at a scheduled date and time.

However, there have been problems in the conventional method of scheduled-date-and-time path setup. A first problem is that, at a scheduled date and time, even with all of the NEs being in normal operations, path setup becomes impossible if a failure occurs in the NMS or a Data Communication Network (DCN) between the NMS and the NEs. That is because each of the NEs becomes uncontrollable from the NMS due to DCN failure.

A second problem is that, if a computational load on the NMS or on a control unit of the NEs is high at the scheduled date and time, a setup process of the NMS is late, and hence the NMS cannot perform the scheduled-date-and-time path setup on time. Such a high computational load on the NMS is possible to occur if a large number of setup processes are performed in a large-scale network including a large number of NEs, or possible to occur by a network failure. Such a high computational load on a control unit of NEs is possible to occur if a large number of setup processes are performed on one NE in a short time period.

SUMMARY OF THE INVENTION

A exemplary feature of the present invention is to provide a path setup system and a path setup method which realize a scheduled-date-and-time path setup function with high reliability even when a failure occurs in an NMS or a DCN, or even when an excessive computational load is placed in the NMS, an EMS, a TC or a control unit of an NE.

In order to solve the above-described problems, according to the present invention, there is provided a path setup system capable of performing path setup, the system comprises: a plurality of NEs (Network Elements) which constitute a network and to which path setup is possible; a path setup unit which inputs, into the NEs, control information for performing any one of path setup, deletion and alteration at a scheduled date and time; and a control unit, of each of the NEs, which performs path setup at the scheduled date and time based on the control information.

In accordance with another aspect of the present invention, there is provided an NE to which path setup is possible comprising: a first check unit which, when a control instruction for path setup at a scheduled date and time is inputted, checks if the control instruction is applicable to the NE; a second check unit which checks if resources of the NE corresponding to the control instruction are available at the scheduled date and time; and a control unit which executes the control instruction in such a manner that the control instruction can be completed at the scheduled date and time.

In accordance with another aspect of the present invention, there is provided an NE to which path setup is possible comprising: first check means for checking, when a control instruction for path setup at a scheduled date and time is inputted, if the control instruction is applicable to the NE; second check means for checking if resources of the NE corresponding to the control instruction are available at the scheduled date and time; and control means for executing the control instruction in such a manner that the control instruction can be completed at the scheduled date and time.

BRIEF DESCRIPTION OF THE DRAWINGS

The above and other objects, features and advantages of the present invention will become more apparent from the following detailed description when taken in conjunction with the accompanying drawings wherein:

FIG. 4 is an example of a path schedule table 13 according to the first embodiment;

FIG. 5 is an example of a resource schedule table 20 according to the first embodiment;

FIG. 6 is an example of a task list 15 according to the first embodiment;

DETAILED DESCRIPTION OF THE PREFERRED EMBODIMENTS

Hereinbelow, preferred embodiments of the present invention will be described in detail based on the drawings. Note that, since the embodiments described hereinbelow are preferred concrete examples of the invention, they are attached with various technically preferable restrictions. The scope of the invention is not necessarily limited by any one of these embodiments unless there is a description such that the embodiment limits the invention.

Figure 1:
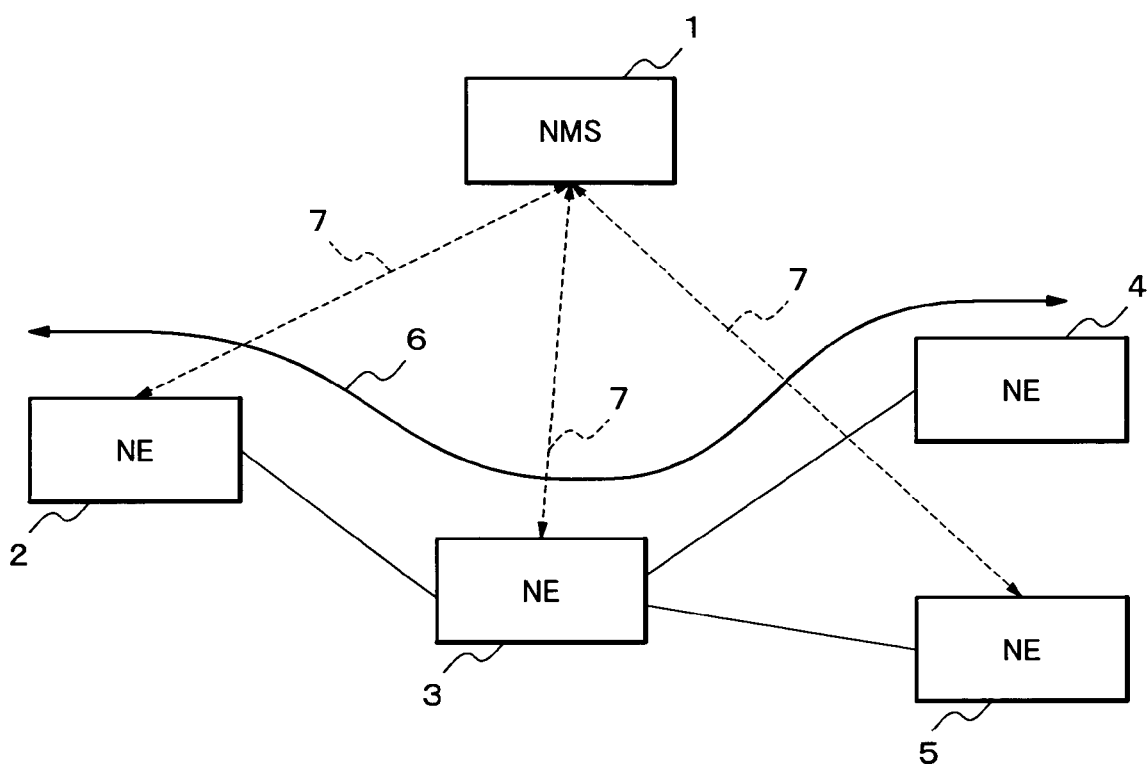
FIG. 1 is an example of a system configuration in a network according to a first embodiment.

FIG. 1 is a block diagram showing an example of networks conceived in the invention. The network shown in FIG. 1 is composed of an NMS 1, and NEs 2 to 5 which are under command of the NMS 1. A DCN 7 connects the NMS 1 with each of the NEs 2 to 5. The NMS 1 is a pass setup unit in the invention and may be replaced by a TC or an EMS. The NMS 1 transmits a path setup command to each of the NEs through the DCN 7. Additionally, the NEs are connected with each other through links. The NE is a unit to which path setup is possible by performing, for example, a Cross Connect (XC) or Switching (SW) which connects certain inputs to certain outputs. The invention is applicable to any type of unit to which path setup is possible. In the following description, a description will be given by taking as an example a TDM SONET/SDH-based unit in which a path is made by a cross connection.

Figure 2:
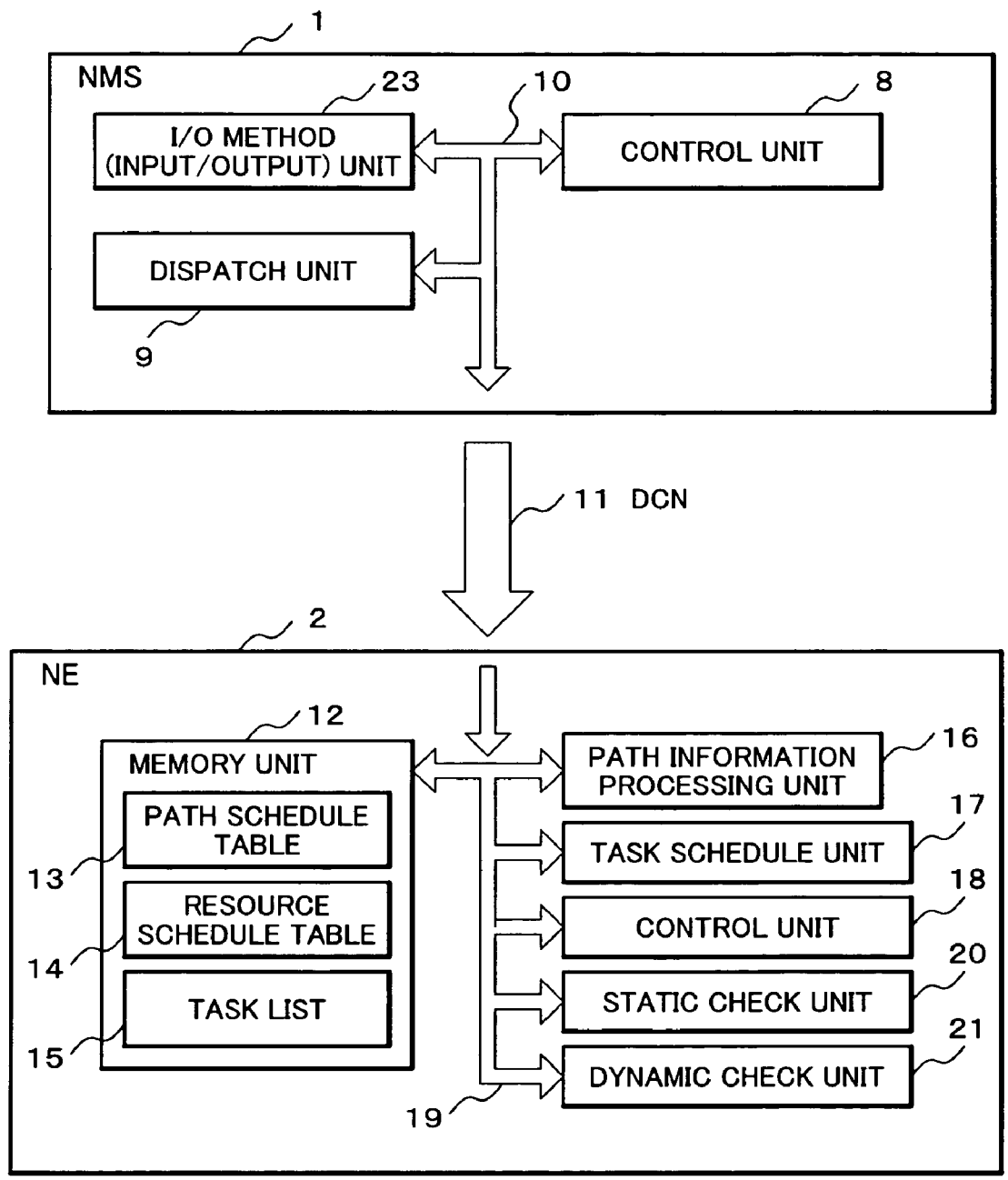
FIG. 2 is a configuration block diagram of an NMS and an NE according to the first embodiment.

FIG. 2 is a configuration block diagram of an NMS1 and an NE according to a first embodiment. Note that all of the NEs (the NEs 2 to 5) in FIG. 1 have the same configurations as the NE. The NMS 1 is provided with at least an I/O (Input/Output) unit 23, a control unit 8, a dispatch unit 9 and a bus 10. The I/O (Input/Output) unit 23 is used by an operator to input setup, teardown and change of path configuration and to input scheduled dates and times thereof.

The dispatch unit 9 generates, from path information inputted to the I/O unit 23, information for controlling each NE on a path route. For example, a network operator inputs into the I/O unit 23 a set of parameters required for path setup for SONET/SDH, the set of parameters including start and end points of a path as well as a bandwidth and a signal type. Furthermore, the network operator inputs a date and time when the inputted path should be set up. The dispatch unit 9 calculates a route based on the specified start and end points of the path, and determines NEs on the route. NEs are the NE2, NE3 and NE4 for a path 6 in FIG. 1. Next, the dispatch unit 9 derives cross connection configuration information respectively for all of the NEs on the route. The cross connection configuration information is composed of: information on interfaces, ports and time slots to be used, in each of an input side and an output side; and the like. The NMS transmits the cross connection configuration information corresponding to each of the NEs. Receiving the cross connection configuration information from the NMS, each of the NEs is possible to cross connect the interface, port, time slot and the like of the input side with the interface, port, time slot and the like of the output side.

The scheduled date and time means a time when a path is actually established and available for use. The scheduled date and time may be information indicating that setup is performed just once, or may be time information indicating that setup is repeatedly performed at regular time intervals. The control unit 8 has a function for controlling each unit of the NMS 1. The bus 10 has a function as a passage through which data is exchanged between the respective units of the NMS 1 or between the inside and the outside of the system.

The dispatch unit 9 delivers, through the DCN 7, cross connection configuration information generated for each of the NEs to the each corresponding NE. In a path 6 in FIG. 1, NEs to which the NMS transmits cross connection configuration information are the NEs 2 to 4.

Figure 3:
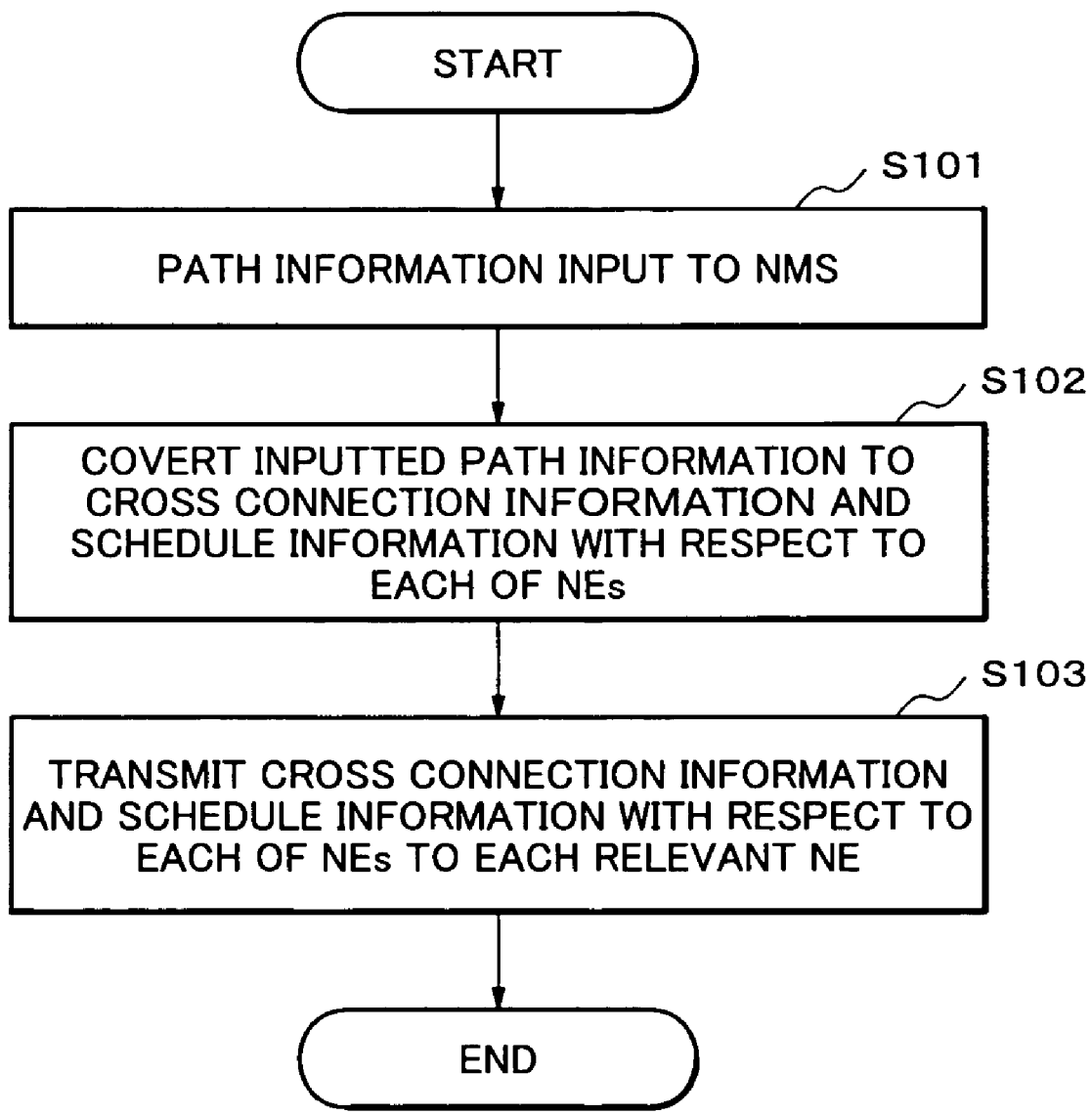
FIG. 3 is a flowchart of processes performed by the NMS according to the first embodiment.

In FIG. 3, a process in the NMS is shown.

A description will be given of the NE. The NE is provided with at least a path schedule table 13, a resource schedule table 14, a task list 15, a memory unit 12, a path information processing unit 16, task schedule unit 17, a control unit 18 for controlling each unit of the NE, a static check unit 20, a dynamic check unit 21 and a bus 19 for exchanging data between the respective units of the NE or between the inside and the outside of the system.

Figure 7:
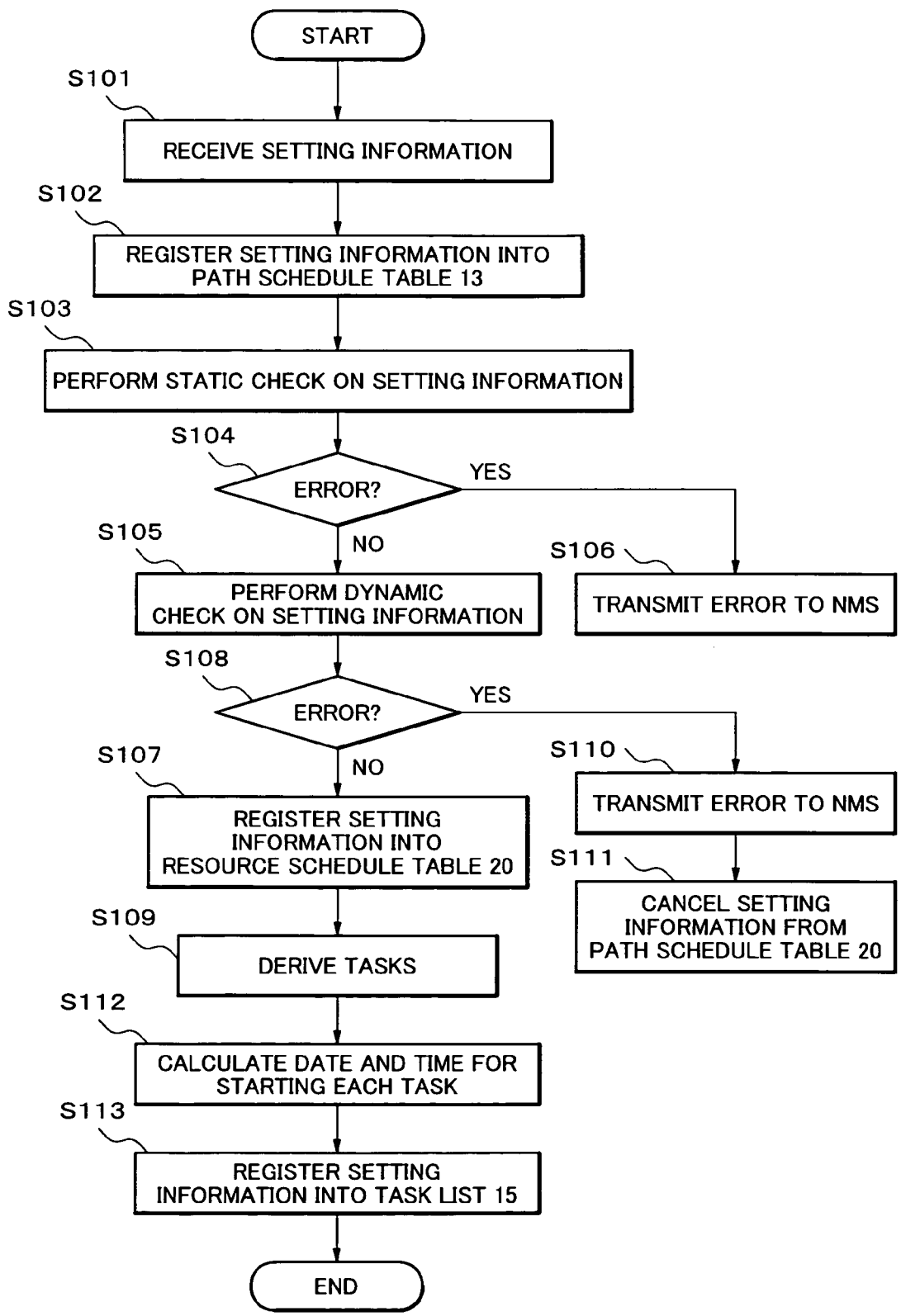
FIG. 7 is a flowchart of processes performed by the NE according to the first embodiment.

Next, with reference to FIG. 7, operations of the NEs will be described. In the setup of the path 6 shown in FIG. 1, three NEs are involved. However, since operations of the three NEs are all alike, one of the NEs will be described here. The NE receives cross connection configuration information distributed from the NMS 1 through the DCN 7. The NE stores the received configuration information in the path schedule table 13 in the memory unit 12 (S101 and S102).

In FIG. 4, an example of the cross connection configuration information is shown. The cross connection configuration information includes a set of: a series of information pieces required for path setup; a scheduled date and time; and a requested content. The requested content is information indicating which one of path setup, deletion and alteration the cross connection configuration information relates to. Note that, with respect to requests on the path which should exist at a scheduled date and time, such as path deletion and path configuration alteration, an ID and the like by which a target path can be identified may be used in place of all of information pieces required for path setup.

The scheduled date and time indicates a time when the cross connection configuration information is applied to the NE and becomes effective.

Next, the static check unit 20 performs a static check on the received cross connection configuration information. The static check is to check whether the received cross connection configuration information is in a range of the NE's capability (S103). That is to check, for example, if a scheduled bandwidth can be set up for a scheduled interface and port.

In this static check, a check is performed while the following three points are assumed. First, a check is performed assuming that system configuration and basic setups of the NE are totally the same when this check is performed and when it is a scheduled date and time. Secondly, with respect to a resource scheduled by the cross connection configuration information, a check is performed within a range of the resource, which is the range usable for path setup at the scheduled date and time. This check presupposes that the NE has a function of previously determining, among resources of the NE, resources appropriate to be used for the scheduled date and time and the rest of resources. Thirdly, a state where any path is not set up and the NE is not at all in use is assumed.

When a trouble has occurred in this static check, a path information processing unit 16 returns an error information to the NMS 1 (S106). As information on the error, it is preferable that it include detailed information regarding a process of having detected the error.

When no trouble has occurred in the static check, then the dynamic check unit performs a dynamic check on the cross connection configuration information (S105), and registers the configuration information into the resource schedule table 20 (S107).

The resource schedule table 20 is a table indicating how each of resources of the NE including interfaces, ports and time slots is used with the passage of time. In FIG. 5, an example of the resource schedule table 20 is shown.

The dynamic check is to check a status of use at the scheduled future date and time with respect to the resources of the NE, and to check whether a resource scheduled in the cross connection configuration information is available. It is checked whether the currently received cross connection configuration information makes a resource conflict with other path setup at the scheduled future date and time.

When a resource conflict has occurred in the dynamic check, the dynamic check unit 21 returns an error information to the NMS 1 (S110). As information on the error information, it is preferable that it include detailed information regarding a process of having detected the error. Such information on the error includes: an ID for the cross connection configuration information of a path attributable for a resource conflict with the target path; and resources in conflict. The-path information processing unit 16, furthermore, cancels the configuration information from the pass schedule table 20 (S111).

When no trouble has occurred in this check, the path information processing unit 16 subsequently compiles the cross connection configuration information to derive all of processes required for path setup (S109), and estimates a date and time when each of the processes should be started (S112).

"All of processes required for path setup" mentioned above are, for example, setup steps in a case where setups on the input side and the output side are processed respectively in different steps, and setup steps for protection. In the following descriptions, each of these setup processing steps is referred to as a task.

The estimation of a date and time is performed for the purpose of making a path setup completed by the scheduled date and time, and the setup processing is performed for the purpose of making each of the steps to be started a necessary time period ahead of the schedule. This estimation of a date and time is performed in consideration of: a capability of the control unit 18; a load for the setup processing; and the like. By making each of the steps to be started an estimated time period ahead of the schedule on each of the NEs, it becomes possible to complete path establishment by the scheduled date and time.

The pass information processing unit 16 registers, into the task list 15, all of the tasks derived in the compiling process as well as the estimated starting dates and times therefor (S113).

The task schedule unit 17 activates each of the tasks registered in the task list 15 at the estimated starting date and time therefor, and thereby performs path setup. The task list 15 may be a timer service of a real-time OS in a control unit for the NE. Note that a task activation process of the control unit 18 is not shown in a flowchart in FIG.7 because it is not continued from the task registration process S113 of the task schedule unit 17.

In FIG. 6, an example of a task list 15 is shown. FIG. 6 shows a state where, after setup of one path is decomposed into a plurality of setup processing steps, the plurality of setup processing steps are being registered while being attached respectively with dates and times when they should be started. Note that a task with a staring date and time left blank indicates a case where the task is executed subsequently following the last task. In this case, it is not required to schedule the staring date and time, and hence the staring date and time is left blank.

When an error has occurred when the control unit 18 executes a task, the control unit 18 transmits error information to the MSN. The error in this case is a run-time error unpredictable through either the static check or the dynamic check. For example, that may be a link failure of an optical fiber which is linked up at a scheduled date and time for the first time. As the error information, it is preferable that it include detailed information such as information regarding a detected trouble.

Incidentally, path deletion and path alteration at scheduled dates and times will be described. Note that the description will center on points on processes respectively of the path deletion and the path alteration at scheduled dates and times, the points being different from the case of the path setup at a scheduled date and time.

In the path deletion, or in the path alteration, the dynamic check unit 21 checks whether scheduled cross connection configuration is existing at a scheduled date and time. Furthermore, the dynamic check unit 21 checks whether no problem is present in scheduled cross connection release or alteration. The problem here means a case where the scheduled cross connection release or alteration does not comply with an operational procedure or operation policy of the NE. Such a case may be, for example, a case where a cross connection scheduled to be released is a path designated as a backup for 1+1 (one-plus-one) protection and it is prohibited for a backup side to release the cross connection. The pass information processing unit 16 cancels the configuration information from the path schedule table 20, as is the case with the path setup at a scheduled date and time.

A second embodiment relates to alarm generation and error detection according to the present invention.

Conventionally, an alarm when a failure is detected includes information on a current path involved in a detected failure. With respect to an alarm according to the embodiment, alarms are generated also for a future path based on path setup at a scheduled date and time.

First, a description will be given of a case where a configuration/components change is made on an NE. The configuration/components change made on the NE means plugging or unplugging of a package, or the like. In a communication system, so-called hot plugging or unplugging, which is to change a package even while the system is in operation, is often performed. By such a configuration/components change, there is a possibility that a cross connection possible to be set up with the NEs may be changed. Therefore, when the configuration/components change is performed, the static check unit 20 again performs a static check on all pieces of configuration information registered in the path schedule table 13.

When an error has been detected in a content of the configuration information, the static check unit 20 generates an alarm and transmits the error information to the NMS. Furthermore, the path information processing unit 16 updates the path schedule table 13, the resource schedule table 14 and the task list 15. The path information processing unit 16 sets a flag in a corresponding entry in association with the path schedule table 13, the resource schedule table 14 and the task list 15. The path schedule unit 17 activates a task for which the flag has been set, and does not perform path setup.

On condition that a further configuration/components change on the NE has been made and it is confirmed that the error has been removed by performing a static check, the path information processing unit 16 unsets the flag.

Otherwise, upon receipt of error information, the NMS automatically, or by way of a network operator, cancels or resets a piece of the configuration information which has been detected as the error, whereby the error is removed.

Next, a description will be given of a case where an NE has detected a failure. At first, the control unit 18 performs a process which it normally performs at the time of detecting a failure. That is, the control unit 18 transmits the detected failure to the NMS and generates alarms about all of resources of the NE involved in the detected failure. Additionally, the control unit 18 performs such a process as lighting an alarm lamp of the NE.

Then, the static check unit 20 performs a static check on all pieces of configuration information registered in the path schedule table 13.

When an error has been detected in a content of the configuration information, the path information processing unit 16 generates an alarm and transmits the error to the NMS. As information on the error, it is preferable that it include detailed information regarding a process of having detected the error. It is also preferable that the error information include the same information as included in the error information in the first embodiment.

Then, the path information processing unit 16 updates the path schedule table 13, the resource schedule table 14 and the task list 15, and this is followed by the same processing as is the case with the configuration/components change.

Subsequently, the dynamic check unit 21 performs a dynamic check on all pieces of configuration information registered in the path schedule table 13. This check is performed because a status of path setup at a scheduled date and time changes when an error has been detected in the static check.

When an error has been detected in the dynamic check as well, the same processes as those in the static check are performed. That is, the path information processing unit 16 generates an alarm and transmits the error to the NMS. Then, the path information processing unit 16 updates the path schedule table 13, the resource schedule table 14 and the task list 15, and sets a flag in an entry in association with them.

Upon recovery from the error as well, similarly to the case of the configuration/components change, a static check and a dynamic check are performed. Then, on condition that it is confirmed that a source of the problem has been removed, the path information processing unit 16 updates the path schedule table 13, the resource schedule table 14 and the task list 15, and cancels the flag of the related entry.

According to this embodiment, at the time of changing configuration/components in the NE or occurrence of an failure, a network operator is enabled to know influences thereby on future "path setup at a scheduled date and time" and hence to make an action in advance against the influences. Furthermore, it becomes possible to restrain unnecessary errors from occurring at the scheduled date and time.

In a third embodiment, when path setup at a scheduled date and time is set, as well as a date and time for opening a path, a date and time for deleting a path is scheduled simultaneously. In the first embodiment, the NMS transmits to NEs path setup at a scheduled date and time, and path deletion at another scheduled date and time, respectively as separate pieces of path information. In this embodiment, one piece of the path information includes dates and times respectively for path setup and for path deletion. Therefore, the path information is provided as path information for scheduling a term whereas the path information in the first embodiment is path setup information at a scheduled date and time.

A description will be given of operations of an NE in a case where the NE has received, from an NMS, path information according to this embodiment. The NE performs operations substantially similar to those in the first embodiment performed by the NE upon reception of two pieces of path information which respectively relate to scheduled-date-and-time path setup information and scheduled-date-and-time path deletion. That is, by considering the one piece of path information as two occasions of setup which are scheduled-date-and-time path setup and scheduled-date-and-time path deletion, a static check and a dynamic check are sequentially performed respectively for the path setup and the path deletion. Finally, the path information processing unit 16 expands and registers setup processing steps, for the two processes of the path setup and disconnection, into the task list 15.

Note that, needless to say, on condition that a problem has been detected in a static or dynamic check for processing path setup at a scheduled date and time, the path information processing unit 16 is not required to forward its processing to path deletion. Additionally, on condition that processing for scheduled-date-and-time path setup is completed without a problem all the way through a static and dynamic check, the path information processing unit 16 may skip a static check for processing path disconnection at a scheduled date and time.

A fourth embodiment relates to a case where the present invention is applied to a GMPLS (Generalized Multi Protocol Label Switching) or MPLS (Multi Protocol Label Switching) network.

While this embodiment is applicable to each of a GMPLS network and a MPLS network, a description will be given by way of a GMPLS network in this embodiment. At the beginning, GMPLS in general will be described only with respect to points thereof which serve the purpose of describing this embodiment.

Figure 8:
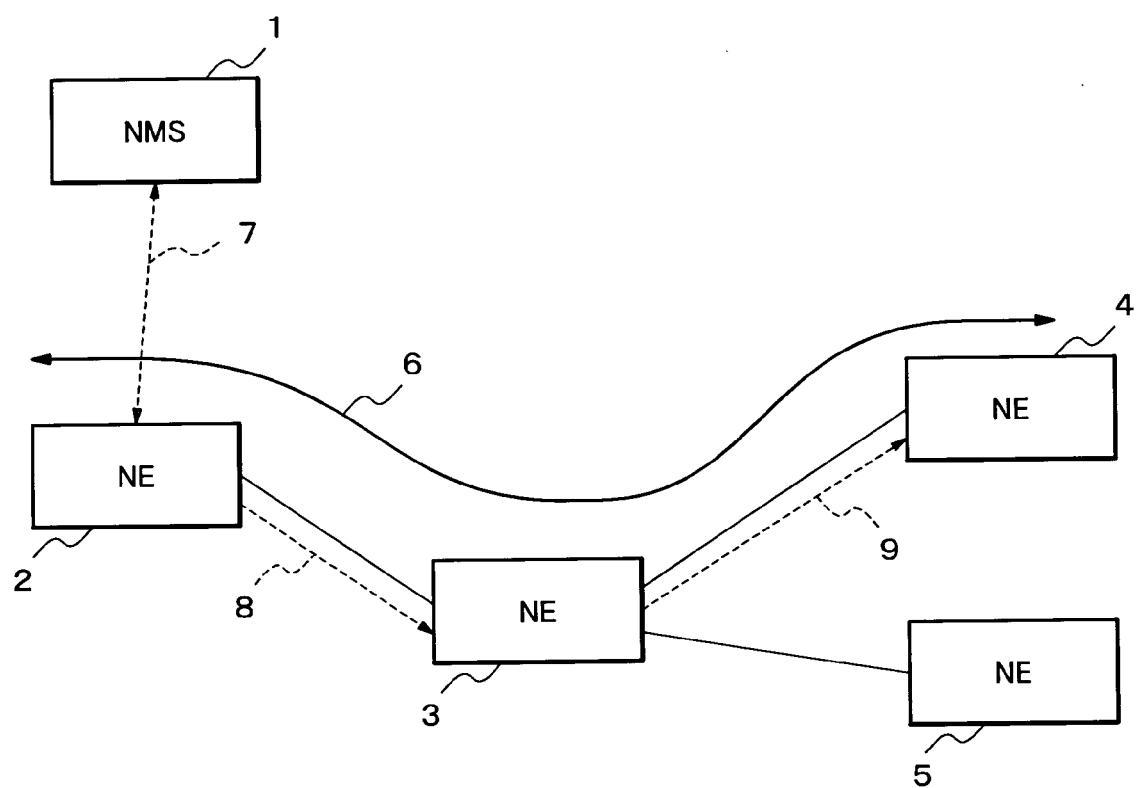
FIG. 8 is an example of a system configuration in a network according to a fourth embodiment.

With reference to FIG. 8, a description will be given of a GMPLS network.

When path setup is set in the GMPLS network, an NMS issues, only to an NE which becomes an initiator of a path, an instruction for the path setup. In FIG. 8, for the purpose of setting path setup for a path 6, an NMS 1 inputs an instruction for path setup only to an NE 2. Meanwhile, in the GMPLS network, it is not necessarily the NMS that transmits an instruction for path setup. It is also possible that a command is inputted to the NE by an EMS or a TC. However, the description will be given by way of a case where the NMS is used. In FIG. 8, a broken line 7 indicates transmission of an instruction for path setup from the NMS to the NE.

Next, by use of FIG. 10, a description will be given of a flow of path setup in GMPLS according to a conventional method. Note that the description will center on points related to the present invention.

Each of NEs continuously exchanges the latest routing information with the other NEs by routing protocols such as OSPF (Open Shortest Path First) and OSPF-TE (OSPF-Traffic Engineering) (1000). The routing information includes: link information indicating a connection correlation of of NEs within entirety the network; and detailed information on the link. The detailed information on the link further includes a kind of a physical medium of the link, an available bandwidth of the link, and the like.

For the purpose of setting path setup for the path 6, the NMS 1 transmits, to the NE2, information on traffic parameters such as a bandwidth of the path, and on an NE which becomes a terminator of the path (1001). For the path 6 in FIG. 8, the NE 4 becomes a terminator.

Upon receipt of the instruction for the path setup from the NMS 1, the NE2 calculates a route from the NE 2 to the NE 4 by assuming the given traffic parameters as conditions. In the route calculation, the latest link information advertised by the OSPF-TE is used. An example of the path 6 in FIG. 8 indicates a case where a route reaching the NE 4 by passing through an NE 3 is calculated.

Then, the NE 2 reserves resources of the NE 2 required for the setup of the path 6. The resources here mean interfaces, ports and further time slots which are available for use. The NE 2 transmits a path message based on an RSVP (Resource ReSerVation Protocol) or an RSVP-TE (RSVP-Traffic Engineering) to the NE3 which is the following hop on the route (1002). This path message includes: traffic parameters such as a bandwidth of the path; information at least on the terminator NE and route information; and the like.

Upon receipt of the path message from the NE 2, the NE 3 reads out the traffic parameters and the route information from the path message. The NE 3 reserves resources of the NE 3 required for the path setup. Then, the NE 3 transmits a path message to the NE 4 which is the following hop in the route (1003).

Upon receipt of the path message, the NE 4 reads out the information contained in the path message in the same manner as the NE3 has done. Then, the NE 4 performs setup processing for the scheduled path (1004). Unlike the NE3, the NE4 does not make resource reservation as it is the terminator NE. Subsequently, the NE 4 advertises by use of the OSPF-TE protocol to all of the NEs within the network that a link state has been changed due to the path setup (1009). In this advertisement, a link of the NE4 includes information on a link state such as an increase in used-bandwidth, a decrease in unused bandwidth or the like as a result of the path setup. In a state where this advertisement is flooded to each of the NEs within the network, the each NE updates a link of the NE 4 to the latest information, and the following route calculation is to be performed. Upon completion of the path setup processing, the NE 4 transmits, to the NE 3, a Resv message based on the RSVP-TE (1005). This Resv message is a response message corresponding to a path message from the NE 3 to the NE 4.

Upon receipt of the Resv message from the NE 4, the NE 3 performs setup processing by using the reserved resources (1006). In the same manner as the NE 4 has done, the NE 3 advertises by the OSPF-TE that a link state has been changed (1010). In the same manner as the NE 4 has done, the NE3 transmits a Resv message to the NE 2 (1007).

Upon receipt of the Resv message from the NE 3, the NE 2 performs setup processing by using the reserved resources in the same manner as the NE 3 has done (1008). In the same manner as the NEs 4 and 3 have done, the NE 2 advertises by the OSPF-TE that a link state has been changed (1011).

Note that, in GMPLS, a network for transmitting and receiving massages based on the RSVP-TE or the OSPF-TE between NEs is called a C-Plane (Control Plane).

Figure 10:
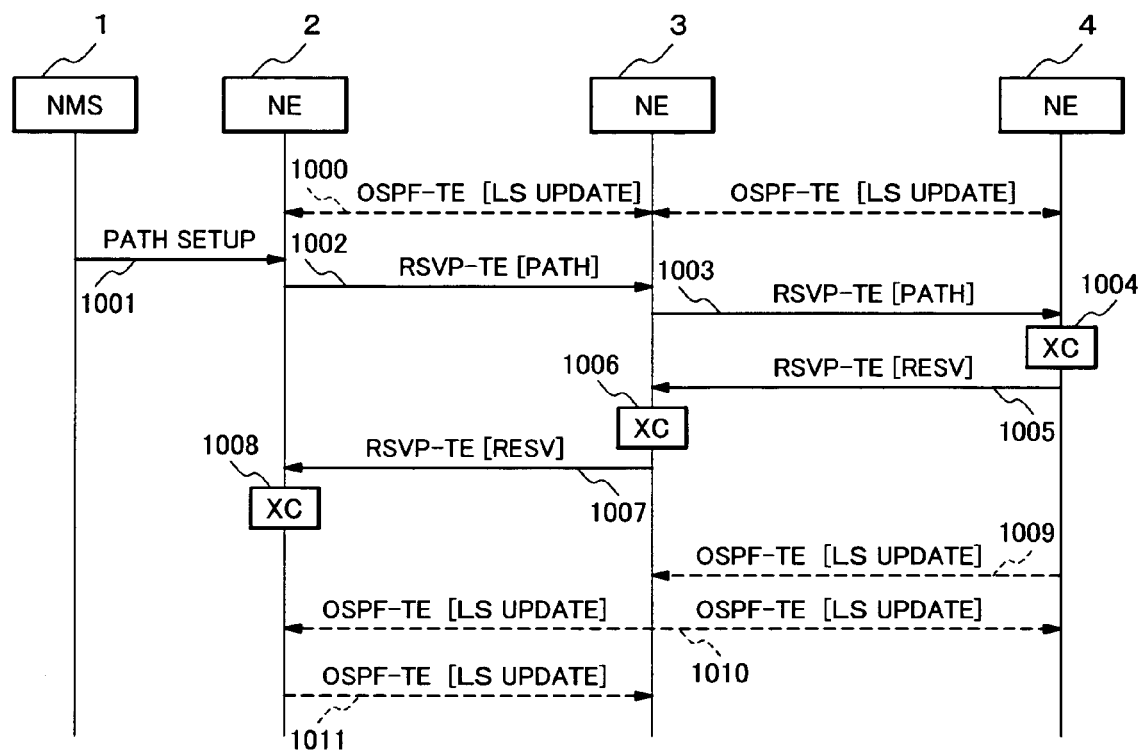
FIG. 10 is a protocol sequence diagram according to a conventional method corresponding to a protocol sequence diagram according to any one of the fourth embodiment and fifth to eighth embodiments.

In FIG. 10, the messages (1000, 1009, 1010 and 1011) based on the OSPF-TE indicated as broken lines are expressed in the diagram as if these respective messages based on the OSPF-TE are exchanged between the NEs 2 and 3 and between the NEs 3 and 4. This expression means that each of the NEs 2 to 4 only advertises a message based on the OSPF-TE. In the present invention as well as in the OSPF-TE in general, it is not necessarily the case that messages are exchanged between the NEs 2 and 3 and between the NEs 3 and 4 in line with the drawing. How messages are exchanged in the OSPF-TE depends on a configuration of the OSPF-TE and the C-Plane network. The description here applies also to the following message flow diagrams.

In FIG. 10, each of the NEs is expressed in the diagram as if, after exchanging a message based on the RSVP-TE, the each NE exchanges messages, based on the OSPF-TE, related to link information update after the path setup. This expression is presented for the purpose of simply illustrating message exchanges based on the RSVP-TE and the OSPF-TE. In the present invention as well as in general, whether or not the OSPF-TE-based link information update after the path setup in reality is performed after the RSVP-TE based message depends on packaging. The description here applies also to the following message flow diagrams.

Figure 9:
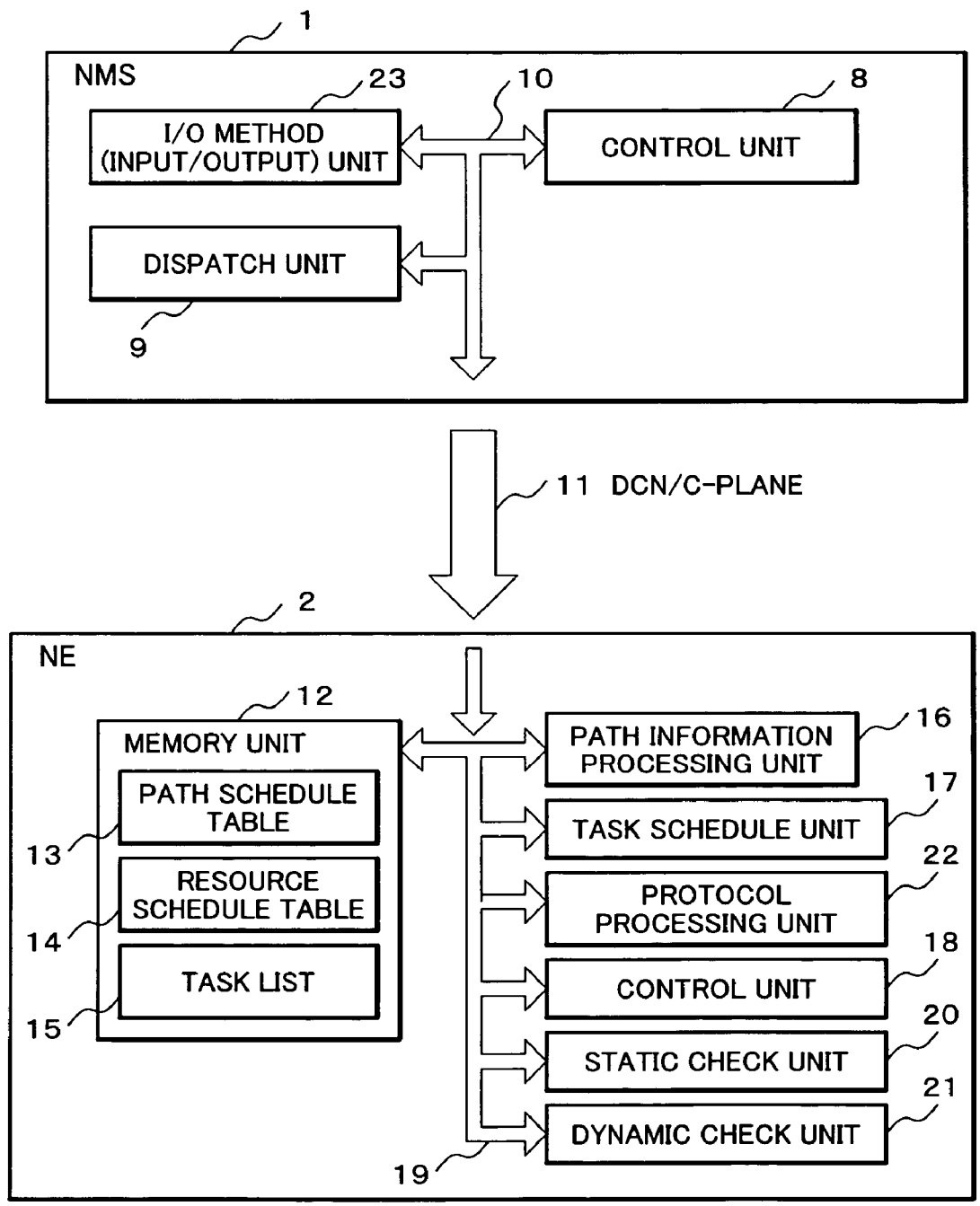
FIG. 9 is a configuration block diagram of an NMS and NEs according to the fourth embodiment.

Next, by using FIG. 9, configurations respectively of the NMS and of the NE according to this embodiment will be described.

The configuration of the NMS in this embodiment is the same as the configuration of the NMS in each of the first to third embodiments. However, performed operations by the path dispatch unit 9 differ from those in the NMS in each of the first to third embodiments. The path dispatch unit 9 in each of the first to third embodiments expands inputted path information into cross connection processes respectively corresponding to NEs on a route of the path. Alternatively, the path dispatch unit 9 in this embodiment does not expand path information, which is inputted by the I/O unit, into cross connection information. Additionally, the NMS in this embodiment distributes, only to an initiator NE, path setup information as well as a scheduled date and time. The description here applies also to the following embodiments.

The configuration of the NE in this embodiment is the configuration where a protocol processing unit 22 is added to that of the NE in each of the first to third embodiments. The protocol processing unit 22 processes the OSPF-TE and RSVP-TE protocols, and performs a route calculation.

Figure 11:
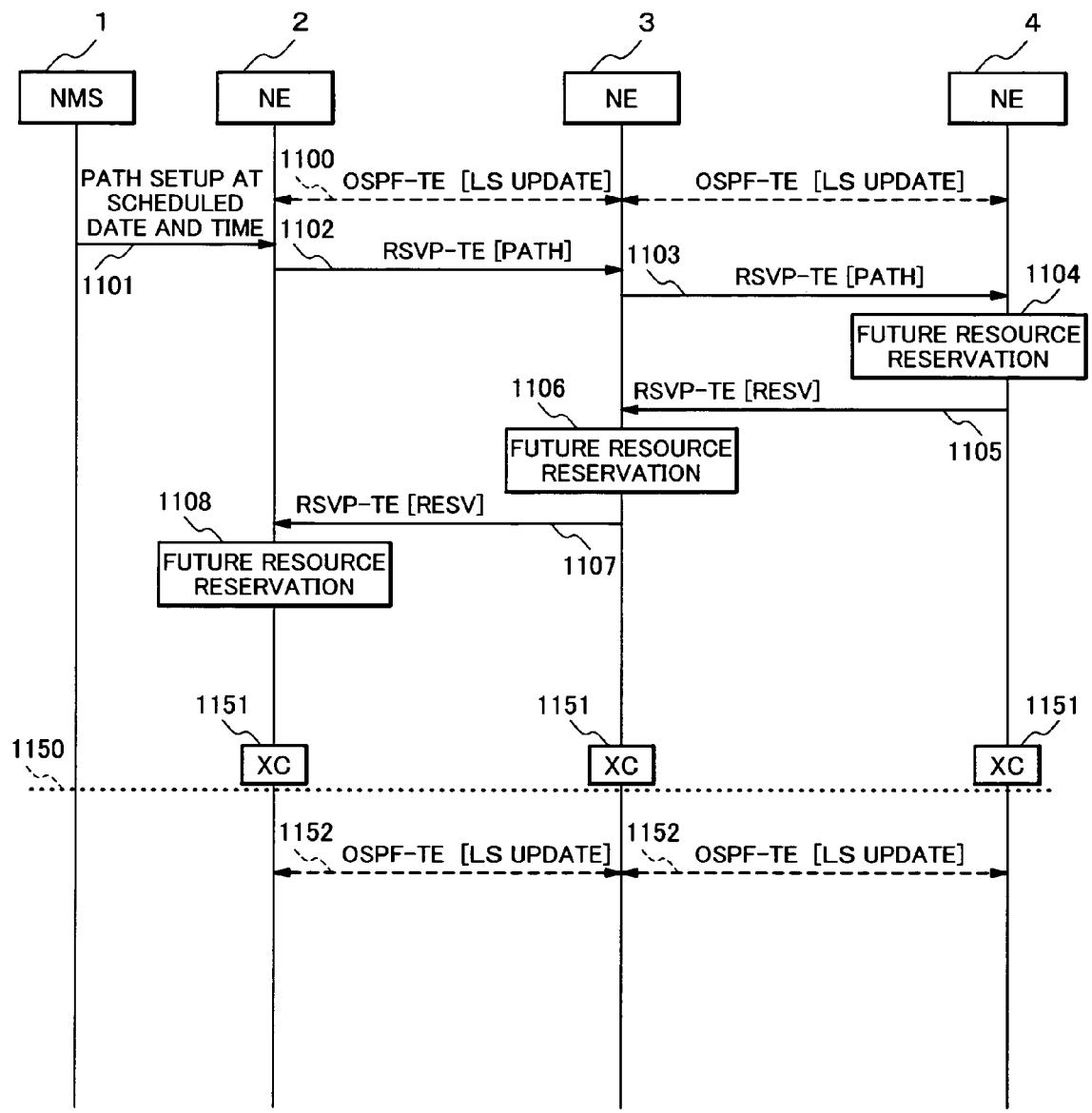
FIG. 11 is a protocol sequence diagram according to the fourth embodiment.

Next, by using FIG. 8 and 11, operations in this embodiment will be described by taking as an example a flow in which the path setup of path 6 is set at a scheduled date and time.

When a path setup at a scheduled date and time is inputted from the NMS 1 to the NE 2 as an initiator (1101), in the similar manner as when the NMS 1 makes an instruction in each of the first to third embodiments, the path information processing unit 16 plans resources to be used for the path. Next, the path information processing unit 16 performs static and dynamic checks on the path setup information (equivalent to the processes from S101 to S108 in the first embodiment). Note that basic configurations of the path schedule table 13, the resource schedule table 14 and the task list 15 may be the same as those in each of the first to third embodiments.

In this embodiment, the static check unit 20 and the dynamic check unit 21 respectively perform the same checks as those in each of the first to third embodiments perform. Furthermore, the dynamic check unit 20 checks if unused bandwidths, in contrast to all of bandwidths with respect to the whole NE or to each interface and to each port, are within allowable ranges. This check is performed because a NE manages own resources autonomously in GMPLS.

When a problem has been found in the static and dynamic checks, transmission of an error and generation of an alarm are performed as performed in each of the first to third embodiments. Furthermore, processes are performed to the path schedule table 13, the resource schedule table 14 and the task list 15 (equivalent to the processes of S110 and S111 in the first embodiment).

When no problem has been found in the static and dynamic checks, the pass information processing unit 16 of the NE 2 reserves resources to be used at a scheduled future date and time. Furthermore, the protocol processing unit 22 transmits to the NE 3 a path message of the RSVP-TE (1102).

The transmitted path message includes at least information that it regards to path setup at a scheduled date and time and information on the scheduled date and time, in addition to conventional information such as parameter information required for the path setup and route information. Otherwise, the path message may be considered as including the information that it regards to path setup at a scheduled date and time, only if the message includes information on the scheduled date and time. The path message may include these kinds of information regarding the path setup at a scheduled date and time by extending the conventional RSVP-TE to introduce a new object.

Unlike in the cases of the first to third embodiments, the NE 3 receives the path setup information through a path message of the PSVP-TE. The protocol processing unit 22 reads out required information from the received path message. Then, the static check unit 20 and the dynamic check unit 21 respectively perform the static and dynamic checks as performed in each of the first to third embodiments.

When a problem has occurred in the static or dynamic check, the protocol processing unit 22 of the NE 3 returns to the NE 2 a message indicating an error of the RSVP-TE (1102). The message indicating an error of the RSVP-TE in this case is, for example, PathErr. The message may further include additional information regarding the error. The PathErr message transmitted here is the same as a conventional message of the PSVP-TE except for the case where the additional information regarding the error is included therein. Nevertheless, the PathErr message is different from the conventional PathErr message in that a path indicated by the massage is a path scheduled to be set up in future.

When no problem has occurred in the static and dynamic checks, the pass information processing unit 16 of the NE 3 reserves resources to be used at the scheduled future date and time. Furthermore, the protocol processing unit 22 of the NE 3 transmits to the NE 4 a path message of the RSVP-TE. The path message transmitted from the NE 3 includes information regarding the path setup at a scheduled date and time as the message from the NE 2 includes (1103), in addition to conventional information required for the path setup such as traffic parameters and route information.

Upon receipt of the path message of the RSVP-TE from the NE 3, the NE 4 performs processes from the static check to the dynamic check in the similar manner as the NE 3 performs.

When a problem has occurred in the static or dynamic check, the protocol processing unit 22 of the NE 4 transmits to the NE 3 a message indicating an error by use of the RSVP-TE in the similar manner as the NE 3 transmits.

When no problem has occurred in the static and dynamic checks, the pass information processing unit 16 of the NE 4 performs processes until a registration process into the task list 15 (equivalent to the processes from S109 to S113). Because the NE 4 is a terminator of the path, it confirms resource reservation by performing the processes until the registration process into the task list 15 (1104). Furthermore, the NE 4 transmits to the NE 3 a Resv message of the RSVP-TE (1105).

Upon receipt, by the NE 3, of the Resv message from the NE 4, the protocol processing unit 22 of the NE 3 interprets the Resv message. As done by the NE 4, the NE 3 confirms the resource reservation at a future date and time by performing processes until a registration process into the task list 15 (1106). Then, the protocol processing unit 22 of the NE 3 transmits to the NE 2 a Resv message (1107).

Upon receipt, by the NE 2, of the Resv message from the NE 3, the NE 2 performs processes as the NE 3 performs. That is, the protocol processing unit 22 of the NE 2 interprets the Resv message, and the NE 2 performs processes until a registration process into the task list 15. Thereby, the NE 2 confirms the resource reservation at a future date and time (1108).

With the above described processes, a series of path setup flows are completed. A message sequence for path setup in this embodiment is the same as that of the conventional RSVP-TE except for a point that the sequence includes information regarding path setup at a scheduled date and time. Therefore, in this embodiment, path setup, which in the RSVP-TE is path setup at a scheduled date and time and is present until arrival of the scheduled date and time, is treated in the similar manner as normal GMPLS path setup without a scheduled date and time is treated. For example, with respect to an optional operation "Refresh" of the RSVP-TE, the Refresh is performed in the similar manner as normal path as if a path has been set up as usual, even before arrival of a scheduled date and time.

Next, a description will be given of operations of the RSVP-TE when it arrives at a scheduled date and time in this embodiment. A broken line 1150 in FIG. 11 indicates arrival of a scheduled date and time.

In this embodiment, the RSVP-TE does not perform operations regarding the relevant path setup except for routine operations such as the Refresh even at the time when it arrives at a scheduled date and time. The control unit 18 executes tasks registered in the task list 15, and executes the path setup (1151).

Next, a description will be given of operations of the OSPF-TE in this embodiment. In this embodiment, when cross connection has been set up by the control unit 18 of the NE on condition that it has arrived at a scheduled date and time, OSPF-TE advertises a link state message that indicates that used bandwidths are changed (1152). Information on an unused bandwidth thus advertised by the OSPF-TE becomes a network status at the current date and time. Upon completion of setting up the relevant path, the control unit 18 informs, to the protocol processing unit 22, of changes in a link state corresponding to contents of the setup. The protocol processing unit 22 advertises the bandwidth changes in compliance with operational setups of the OSPF-TE.

Next, a description will be given of resource management in this embodiment.

Even in a state where path setup at a scheduled date and time is registered, the OSPF-TE in this embodiment does not advertise the bandwidth changes at least until after cross connection has been set up on condition that it has arrived at a scheduled date and time. Therefore, there is a possibility that, during a time period until the scheduled date and time arrives after the scheduled-date-and-time path setup has been registered, a resource conflict may be caused by a request for different path setup.

In that event, the path information processing unit 16 performs processes as follows.

In a state where, with a priority level being designated with respect to each of the paths, the priority level of the path requested later is higher while NEs are configured to make the path priority levels effective, the path setup requested earlier is preempted. A procedure of the preemption is set as the same procedure as is set in the case of normal path setup with no scheduled date and time. The preemption is performed when a resource conflict occurs after cross connection for the path more lately requested has been configured. If a resource conflict is predictable at the time when path setup with a scheduled date and time having a higher priority level is requested, it is preferable that an alarm be generated.

In a state where, with a priority level being designated with respect to each of the paths, the priority level of the path requested later is lower while NEs are configured to make the path priority levels effective, priority is given to the path setup with a scheduled date and time requested earlier. The path requested later cannot reserve resources and results in the PathErr.

Note that how priority levels are designated is, for example, a manner in which it becomes possible to compare costs for two or more paths by comparing priority levels thereof, or a manner which suppose individual situations such as whether or not a path permits preemption.

Next, a description will be given of a case where priority levels of paths cannot be used for priority determination on a path. For example, that is a case where a priority level is not designated to each of the paths, or where designated priority levels are made ineffective in NEs. In such a case, priority determination is made by using a chronological order of inputting path setup at scheduled dates and times. Alternatively, it may be done by using a chronological order of scheduled dates and times of scheduled-date-and-time paths. Which one of the above orders to be used, as well as whether to perform the preemption of a path, may be determined as what can be set in compliance with operation policies of the NEs.

Next, a description will be given of path deletion. In path deletion at a scheduled date and time, a date and time for the deletion may be scheduled at the time of scheduling path setup as shown in the third embodiment, or may be scheduled independently with the path deletion. In the case of path deletion, processes are performed as in the case of path setup. That is, when it arrives at the scheduled date and time, each of the NEs executes setting of cross connection release for the path deletion.

Additionally, a description will be given of a case where path setup at a scheduled date and time is cancelled before the scheduled date and time. In this embodiment, on an RSVP-TE basis, a scheduled-date-and-time path is treated in the same manner as a normal path even before the scheduled date and time. Therefore, the scheduled-date-and-time path is deleted in the same manner as a normal path. A sequence for the path deletion complies with a normal sequence for path deletion on the RSVP-TE basis, except that a path designated for the deletion is a path set up by scheduled-date-and-time path setup. The dynamic check unit 21 checks whether to perform path deletion, and the path information processing unit 16 updates the path schedule table 13, the resource schedule table 14 and the task list 15.

According to this embodiment, it becomes possible to set path setup at a scheduled date and time in the GMPLS or MPLS network.

A fifth embodiment is an embodiment obtained by partially altering the fourth embodiment. In this embodiment, the OSPF-TE based operations in the fourth embodiment are partially altered.

Figure 12:
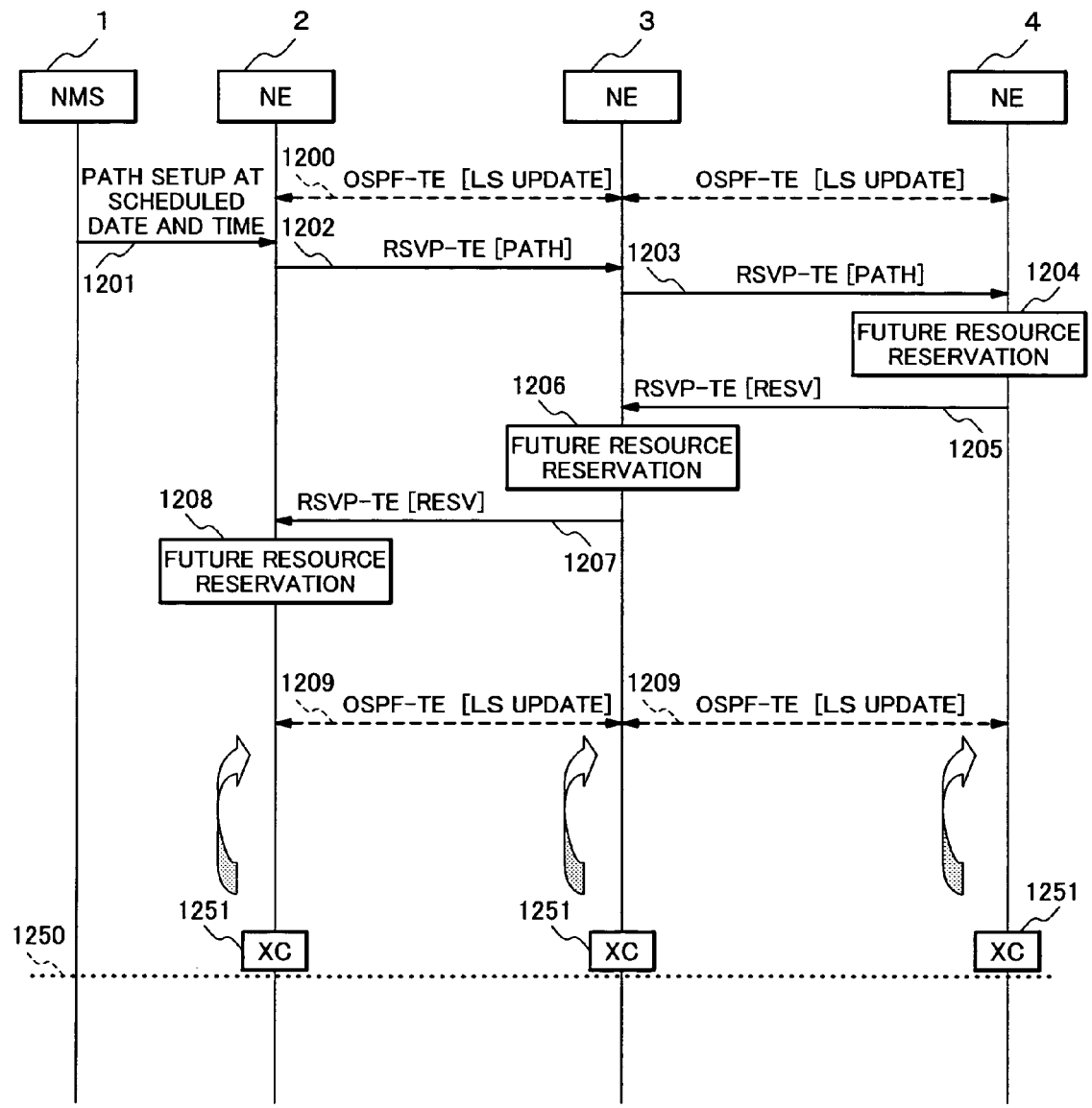
FIG. 12 is a protocol sequence diagram according to the fifth embodiment.

This embodiment will be described by illustrating it in FIG. 12. In this embodiment, bandwidth changes accompanied with path setup at a scheduled date and time are advertised by the OSPF-TE before arrival of the scheduled date and time (1209). It is preferable that a time for advertising in this case be alterable by setting. It is also preferable that the time for advertising be adjusted in accordance with registered processes for the pass setup at a scheduled date and time. It is preferable that the bandwidth changes are possible to be advertised at least several to several ten minutes before the scheduled date and time (1250).

To change timing of the bandwidth advertisement by the OSPF-TE, the path information processing unit 16 registers a task for it in the task list 15 with a expected time and date of advertisement. The registered task informs the protocol processing unit 22 of bandwidth changes and changes in a link state at a predetermined time before arrival of the scheduled date and time. Upon arrival of the scheduled date and time, when the control unit 18 has set up cross connection, the changes in the link state are not informed.

Hereinbelow, this embodiment will be described further in detail.

A description will be given by taking as an example a case where a time period required for path setup or path deletion at a scheduled date and time is shorter than a time period required for such an advance advertisement based on the OSPF-TE in this embodiment, that is, a case where the following two paths are set up for the same link:

(i) path setup with scheduled dates and times, from 2005 Aug. 4 12:00 to 2005 Aug. 4 12:55 (path opening at 2005 Aug. 4 12:00, and path deletion at 2005 Aug. 4 12:55); and (ii) path setup with a scheduled date and time from 2005 Aug. 4 13:00.

In this case, there is an interval of 5 minutes between the paths in (i) and (ii). Here, even if a time period required for an advance advertisement based on the OSPF-TE is specified as 20 minutes, there is still an interval of only 5 minutes between the paths in (i) and in (ii). In such a case, an advance advertisement, regarding the path in (ii), based on the OSPF-TE should convey an advertisement equivalent to a case where the path in (i) and the path in (ii) are switched in a continuous manner. For example, suppose that the paths in (i) and in (ii) respectively have bandwidths of 1 G and of 4 G. In this case, if the switch between the paths in (i) and in (ii) occurred without the interval of 5 minutes, the advertisement would regard on a changed portion of the link state, which is a bandwidth of 3 G. Therefore, with respect to the path setup of (ii) in this embodiment, link information indicating that there has been an additional decrease in bandwidth by 3 G should be advertised at 2005 Aug. 4 12:40.

Additionally, if the same resources are used for the paths in (i) and in (ii), whereby there is no change in the link state advertised by the OSPF-TE, an advance advertisement, accompanied with the path setup of (ii) in the embodiment, based on the OSPF-TE, should not be made.

According to this embodiment, it becomes possible to restrain a route calculation based on the OSPF-TE from becoming unstable. Additionally, a failure in path setting is restrained, and a computational load on an NE is reduced. Furthermore, it becomes possible to relieve loads accompanied with protocol processing of the OSPF-TE by distributing and averaging the loads.

This embodiment is effective for a case where it requires time to flood link information based on the OSPF-TE in a large-scale network. According to this embodiment, it becomes possible to prevent a route calculation based on the OSPF-TE from becoming unstable due to a delay in flooding the link information, to restrain a failure in path setting, and to reduce a computational load on an NE. Furthermore, it becomes possible to relieve loads accompanied with protocol processing of the OSPF-TE by distributing and averaging the loads in a case where a large number of path setup processes are concentrated during a short time period.

Figure 13:
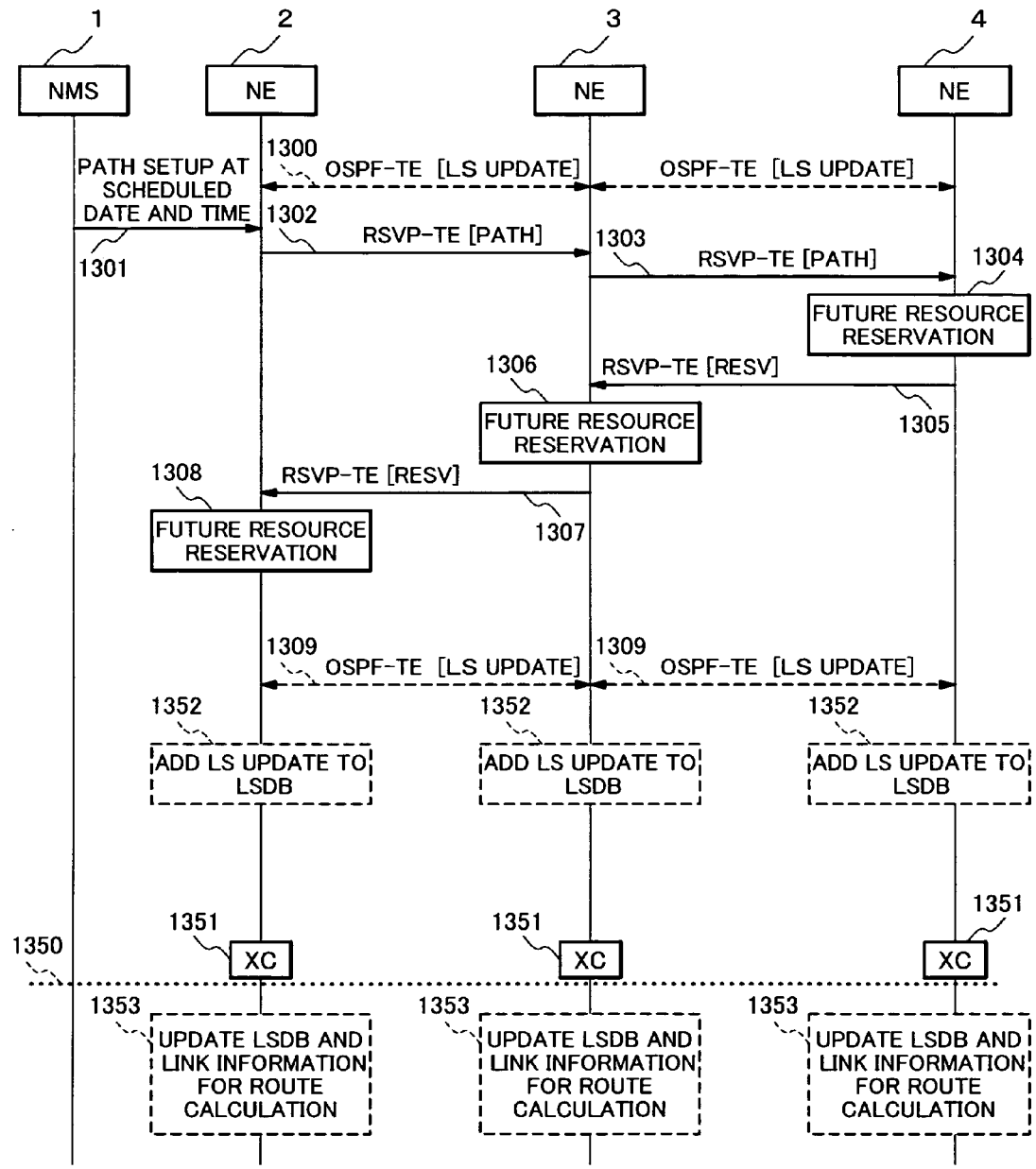
FIG. 13 is a protocol sequence diagram according to the sixth embodiment.

A sixth embodiment is an embodiment obtained by partially altering the OSPF-TE based operations in the fifth embodiment. This embodiment will be described by using FIG. 13.

In this embodiment, update information on a link state through the OSPF-TE protocol is extended. In this embodiment, a scheduled date and time when the update information becomes effective is added to the OSPF-TE based update information on a link state.

A description will be given by taking as an example the following case which is also taken for the fifth embodiment, with:

(i) path setup with scheduled dates and times, from 2005 Aug. 4 12:00 to 2005 Aug. 4 12:55 (path opening at 2005 Aug. 4 12:00, and path deletion at 2005 Aug. 4 12:55); and (ii) path setup with a scheduled date and time from 2005 Aug. 4 13:00. Furthermore, it is supposed that the paths in (i)

and in (ii) respectively have bandwidths of 1 G and of 4 G. In this embodiment, link information in a case where the path in (ii) is set up independently is advertised along with a date and time when the link information should be applied. Here, the case where the path in (ii) is set up independently means, even in a state where the path in (i) or other path has been set up, to generate the link information by supposing that only the path in (ii) is set up. The link information is such that it means information on time slot numbers used in the link, and on used and unused bandwidths of the link. Additionally, a date and time scheduled as the date and time when the link information is set up may be made coincide with the scheduled date and time for the path.

A description will be given of operations of the protocol processing unit 22 of an NE which has received link information including date and time information in the context of this embodiment.

Upon reception of link information including date-and time information in the context of this embodiment, the protocol processing unit 22 inputs the link information with the scheduled date and time information into LSDB (Link State Data Base) of the OSPF-TE (1352) The protocol processing unit 22 transmits and floods the link information to other NEs.

The protocol processing unit 22 does not use the link information with the scheduled date and time information for its route calculation until the date and time scheduled in the link information. Upon arrival of the date and time scheduled in the link information, the protocol processing unit 22 applies the link information with the scheduled date and time to the link information of current status for the corresponding link in the LSDB (1353). The protocol processing unit 22 removes the link state information with the scheduled date and time from the LSDB (1353).

A further detailed description will be given by taking as an example a case where path setup is performed. A used bandwidth in the retained link update information is added to "used bandwidths" in the link information on the relevant link in the LSDB. Furthermore, unused bandwidth information in the retained link update information is subtracted from "unused bandwidth information" in the link information on the relevant link in the LSDB. In a case of path deletion, a field indicating that the path is to be deletion is provided in an LS Update (Link State Update) message based on the OSPF-TE. Otherwise, an OSPF-TE based message may be extended in order that it can contain a negative number in a field thereof which indicates bandwidth information.

Note that, an advance advertisement based on the OSPF-TE may be performed at the same timing as performed in the fifth embodiment, or may be performed at the time when advance setup of a path is scheduled.

Next a description will be given of a route calculation performed by the protocol processing unit 22. The protocol processing unit 22 performs a route calculation for a path using the link state information corresponding to a time and date of the path. When the path is not specified a scheduled date and time and it is to be set up immediately, the protocol processing unit 22 performs the route calculation for the path using the link state information for the present time. When the path is with a scheduled date and time and specified to be set up at a date and time in future, the protocol processing unit 22 performs the route calculation for the path using the link state information for the scheduled date and time. To obtain the link state information for the scheduled date and time, the protocol processing unit 22 rolls forward the link state information from the present time to the scheduled date and time.

The protocol processing unit 22 applies all of link state information with a scheduled date and time that is before the scheduled date and time.

A seventh embodiment is an embodiment obtained by partially altering the RSVP-TE based operations in the fourth embodiment. This embodiment will be described by using FIG. 14. In this embodiment, when path setup is executed upon arrival of a scheduled date and time, an RSVP-TE based message is transmitted from an initiator NE along a route path.

In this embodiment, upon arrival of the scheduled date and time (1450), the RSVP-TE message is transmitted along the path (1452, 1453 and 1454). This message is defined as a path setup execution message. The RSVP-TE message transmitted by the initiator NE includes at least information whereby a path becomes identifiable, the information being such as a path ID.

Additionally, a response message may be transmitted back along the path from a terminator NE to the initiator NE in accordance with necessity in the similar manner as a Resv or Err massage is transmitted.

A description will be given of registration of a task into the task list 15 which is performed by the path schedule unit 17, according to this embodiment. In the initiator NE, the path schedule unit 17 registers into the task list 15 a task of transmitting a path setup execution message. The path schedule unit 17 in each NE on the route registers into the task list 15 a task of waiting for reception of the path setup execution message.

For this embodiment, the initiator NE will be described. In the initiator NE, the protocol processing unit 22 transmits the path setup execution message. At the same time as, or after, the transmission of the path setup execution message, the control unit 18 executes a task registered in the task list 15, and thereby sets up a cross connection. Also in the each NE on the route, upon the protocol processing unit 22's receipt of the path setup execution message, the control unit 18 executes tasks, registered in the task list 15, following the task of waiting for message, and thereby sets up a cross connection. Otherwise, instead of transmission of the path setup execution message, a response massage responding to the path setup execution message may be a cue for executing the cross connection setup. In this case, only the terminator NE executes the cross connection setup when the terminator NE transmits a response message responding to a path setup execution message. Instead, the RSVP-NE message may be transmitted from the terminator NE, not from the initiator NE.

In this embodiment, it is required for path setup at a scheduled date and time to definitely synchronize, among all of NEs within a network, an operation of whether or not each NE complies with a sequence of this embodiment. For this purpose, an operation according to this embodiment is set up in advance among all of NEs within a network. Alternatively, a path message at the time of scheduling path setup at a scheduled date and time may include information, such as a flag, which indicates whether to comply with the sequence of this embodiment. In the latter manner, a network operator is enabled to specify on a path-to-path basis whether to comply with the sequence of this embodiment.

In the seventh embodiment, transmission and reception of RSVP-TE messages are involved at the time of executing cross connection processes, whereby a number of RSVP-TE messages is larger than in the fourth embodiment or in the conventional method. However, in this embodiment as well, processes equivalent to conventional RSVP-TE path messages and to a sequence thereof are completed in advance. The path setup execution message only serves to make effective path setup which has been checked in advance. Therefore, a load on the NE accompanied with the path setup execution message is smaller than that accompanied with the RSVP-TE path messages. Furthermore, a possibility that path setup fails with the path setup execution message is smaller than that with the RSVP-TE path messages. Therefore, it becomes possible to reduce a possibility that path setup fails at a scheduled date and time. Thereby, it becomes possible to reduce loads on a network and on NEs. Furthermore, a probability of successful path setup at a scheduled date and time becomes higher, whereby quality of circuit switched service is enhanced.

Figure 14:
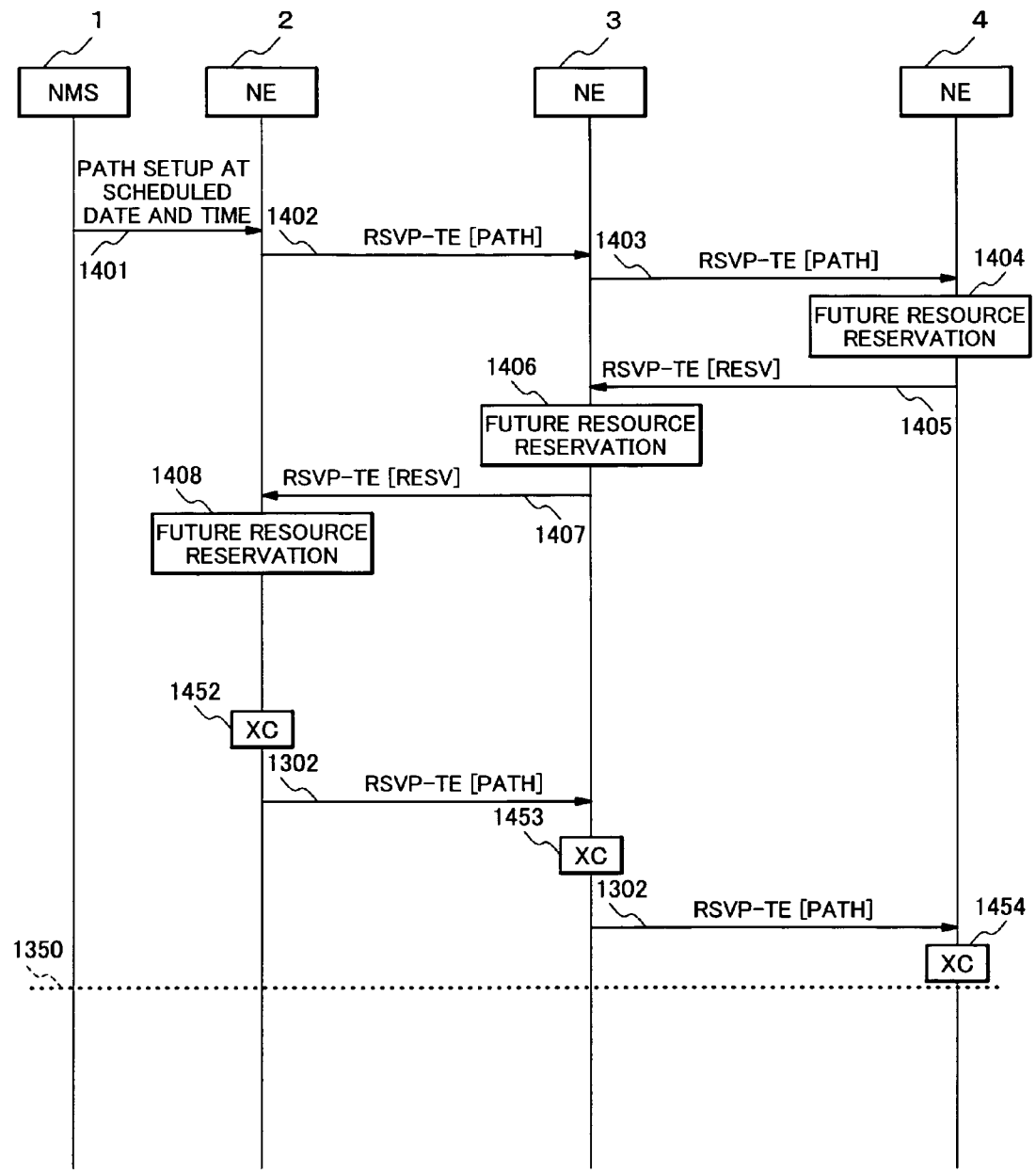
FIG. 14 is a protocol sequence diagram according to the seventh embodiment.

Note that, in FIG. 14, only a sequence relating to the RSVP-TE is illustrated.

With respect to aspects relating to the OSPF-TE, it is possible to combine this embodiment with any of the fifth and sixth embodiments.

According to this embodiment, by allowing a path setup execution message to be transmitted from an initiator NE to each NE on the route, it is possible to substantially match a time period required for executing cross connection setup with that required for path setup based on the normal RSVP-TE. Additionally, it becomes possible to reduce loads on a network and on NEs by reducing a possibility that path setup fails at a scheduled date and time.

A eighth embodiment relates to a case where a failure has been detected, and to a situation where a configuration/components change is made, in the fourth embodiment. With respect to the failure, an alarm may be transferred to each of NEs involved in the failure, by use of an alarm transfer function of the SONET/SDH, or otherwise by use of the RSVP-TE or an LMP (Link Management Protocol).

When a configuration/components change or a failure has been detected in this embodiment, the static check unit 20 performs a static check again with respect to every piece of setup information registered in the path schedule table 13. When an error has been detected in a content of the setup information, the path information processing unit 16 generates error information or an alarm. As the error information, it is preferable that it include detailed information regarding a process of having detected the error. It is preferable that it include at least the same information as included in the case of the first embodiment. Furthermore, the error information may include that the error is attributable to a change in information on configuration/components of the NE.

Then, the path information processing unit 16 updates the path schedule table 13, the resource schedule table 14 and the task list 15. When an error has been detected in a content of the setup information in the static check, the path information processing unit 16 sets a flag in a piece of setup information to which both the resource schedule table 14 and the task list 15 correspond. This flag means that setup information to which the flag is set should not be used for setup as it is.

Next, a message is transmitted from an NE at which a failure has been detected. This message is intended for finally informing the other NEs on the route of the path that a specific path is influenced by the failure or by the configuration/components change. The LMP may be used for this message, or the message may be based on the RSVP-TE. Otherwise, the LMP and the RSVP-TE may be used in combination. A method of finally informing the other NEs on the path route complies with a sequence for a normal path based on the LMP and/or the RSVP-TE. With these messages, a state of the path is synchronized for every NE on the route.

On condition that a flag is being set, that is, a failure exists with respect to the path setup, the control unit 18 does not set up a cross connection even when a scheduled date and time has arrived. Alternatively, in the case of the fifth embodiment, the initiator NE does not transmit a path setup execution message. Additionally, in the case of the fifth embodiment, each NE on the path route does not wait for a path setup execution message.

With an additional configuration/components change, or upon recovery from the failure, the path information processing unit 16 executes a static check, and, if an error is resolved, removes the flag. Furthermore, as is the case when an error occurs, the path information processing unit 16 synchronizes a state of the flag for every other NE on the path route by informing thereto that the problem has been resolved or that recovery from the failure has been achieved.

Note that, on the RSVP-TE basis, a path is kept being set up even while a flag is being set. Therefore, a status check on paths, such as Refresh, is made for the paths including a path for which a flag is set.

In order to handle the failure simply, without an additional configuration/components change or recovery from the failure, to a path for which a flag is set, a network operator deletes and cancels a path scheduled at a future date and time. The path cancellation is performed as is the case with the third embodiment.

With respect to the OSPF-TE as well, processes are performed in compliance with considerations in the fourth and fifth embodiments.

A ninth embodiment is obtained by partially altering operations in the eighth embodiment.

In the ninth embodiment, a case is represented where protection is designated for path setup at a scheduled date and time. In the ninth embodiment, with respect to path setup at a scheduled date and time for which protection is designated, switching, reversion, or rerouting of the path is performed even before it arrives at the scheduled date and time for the path setup.

Path setup for which protection is designated complies with a conventional method except that a date and time is scheduled. Additionally, methods respectively for switching, for reversion and for rerouting of the path also comply with conventional methods except that a path is of path setup at a scheduled date and time.

A description will be given by taking as an example a path for which 1+1 (one plus one) protection is designated. In a case where a failure regarding this path has been detected, the path is switched from a working one to a backup one even before arrival of a scheduled date and time. A sequence for this switching is processed by means of message exchanges based on the RSVP-TE and/or the LMP as is the case with a normal path. In a case where the path has been switched from a working one to a backup one, the path information processing unit 16 of each NE resets processes regarding the relevant path, which have been registered in the task list 15. Specifically, it resets processes in order that a cross connection can be set up for the backup path. Additionally, also in a case where the path is reversed on condition that recovery from a failure has been achieved, the path information processing unit 16 of each NE similarly resets processes, regarding the relevant path, registered in the task list 15.

Likewise, a description will be given of a case where a failure has occurred when rerouting is processed for the path setup for which protection is designated. In this case, an initiator NE of rerouted intervals reroutes a path. This rerouting of a path also complies with a conventional procedure for a normal path. Note that, in the case of rerouting a path. Note that, in the case of rerouting a path, the path information processing unit 16 in an terminator NE of the rerouted intervals, as is the case with the above-mentioned 1+1 or 1:1

(one-by-one), protection, resets processes regarding the relevant path, which have been registered in the task list 15. In each of NEs on the rerouted intervals except for the terminator NE, the path before the rerouting is cancelled and rerouted with a new route.

Upon arrival of the scheduled date and time, a cross connection is set up in a state where the failure has been responded with scheduled protection. For example, the above case will be described by way of a case with 1+1 protection where a failure has been occurred before a scheduled date and time. In a case where a scheduled date and time arrives in a state where the path has been switched from a working one to a backup one before arrival of a scheduled date and time, each NE processes cross connection setup in order to set up a backup path.

Note that a response to the path setup prior to a scheduled date and time is lower in urgency than setup of a normal path. This is because the failure only has to be responded by the time when cross connection setup is processed upon arrival of the scheduled date and time. Therefore, depending on an amount of spare time remaining before arrival of a scheduled date and time, a process for responding to the failure may be delayed. Accordingly, it becomes possible to distribute and average the loads on NEs when a failure has occurred.

Note that, for protection in this embodiment, as well as the above-mentioned method using the RSVP-TE and/or the IMP, a method including AMP (Automatic Protection Switching) may be used, or otherwise, a combination of such a method with the above-mentioned method using the RSVP-TE and/or the LMP may be used.

When only the APS is used therefor, for example, any one of the RSVP-TE, the LMP and the like is not involved. Contents of the cross setup, which are scheduled to be registered into the task list 15, are reset in accordance with a state of switching or reversion accompanied with occurrence of, or recovery from, a failure. Thus, contents of tasks to be executed by the control unit 18 turn into ones to which the state of switching or reversion are applied.

According to this embodiment, it becomes possible to reduce a computational load on NEs when a path is setup after a failure has occurred. Furthermore, it becomes possible to perform path setup at a scheduled date and time even in a state where a failure has been occurred.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims. Furthermore, it is the inventor's intent to retain all equivalents of the claimed invention even if the claims are amended during prosecution.

What is claimed is:

1. A network element (NE) to which path setup is possible, comprising:
   a first checking unit which, when a control instruction for path setup at a scheduled date and time is inputted, checks if the control instruction is applicable to the NE;
   a second check unit which checks if resources of the NE corresponding to the control instruction are available at the scheduled date and time; and
   a control unit which executes the control instruction in such a manner that the control instruction can be completed at the scheduled date and time;
   wherein, when a failure is detected and when a configuration/components change of the NE is made:
   the first check unit further checks if the resources of the NE are applicable to path setup at a scheduled date and time, the path setup corresponding to the control instruction; and
   the second check unit further checks if the resources of the NE are applicable, whereby the control unit further generates, before the scheduled date and time, an alarm with respect to the path setup at the scheduled date and time corresponding to the control instruction.

2. The NE according to claim 1, wherein the control instruction for setting up a path at a scheduled date and time includes: a scheduled date and time when the path is intended to be established; and a scheduled date and time when the path is intended to be deleted.

3. The NE according to claim 1, wherein the control instruction for path setup is made through GMPLS including RSVP-TE and OSPF-TE protocols further comprising:
   a protocol processing unit which processes the protocols of the GMPLS and which transmits and receives a message based on the RSVP-TE including information on the scheduled date and time.

4. The NE according to claim 3, wherein, before message arrives at the scheduled date and time, the protocol processing unit advertises a link information update message based on the OSPF-TE corresponding to the path setup at the scheduled date and time.

5. The NE according to claim 3, wherein, the protocol processing unit transmits and receives a link update message based on the OSPF-TE including a link-information scheduled date and time corresponding to the scheduled date and time, and performs route calculation using a link state information corresponding to the scheduled date and time, and when the link-information scheduled date and time arrives, updates a LSDB (Link State Data Base).

6. The NE according to claim 3, wherein, when a path is set up at the scheduled date and time, the protocol processing unit exchanges a path setup execution message with other NEs on a route of the path.

7. The NE according to claim 3, wherein, when a failure occurs and when a configuration/component change of the NE is made:
   the first check unit further checks if the resources of the NE are applicable to path setup at a scheduled date and time, the path setup corresponding to the control instruction; and
   the second check unit further checks if the resources of the NE are applicable, whereby an alarm is generated before the scheduled date and time with respect to the path setup at the scheduled date and time corresponding to the control instruction.

8. The NE according to claim 7, wherein, in a case where protection is set for the path setup at a scheduled date and time, when a failure occurs and when a configuration/components change of the NE is made, the control unit further performs a control corresponding to a state where the protection is implemented.

9. A path setup method in each of network elements (NEs) which constitute a network, comprising:
   a first checking step of checking, by a first checking unit, when a control instruction for path setup at a scheduled date and time is inputted, checks if the control instruction is applicable to the NE;
   a second checking step of checking, by a second check unit, if resources of the NE corresponding to the control instruction are available at the scheduled date and time; and a controlling step of executing, by a control unit, the control instruction in such a manner that the control instruction can be completed at the scheduled date and time;

wherein, the first checking step further comprises a step of checking if the resources of the NE are applicable to path setup at a scheduled date and time, the path setup corresponding to the control instruction; and the second checking step further comprises a step of checking if the resources of the NE are applicable and a step of generating, before the scheduled date and time, an alarm with respect to the path setup corresponding to the control instruction.

10. The path setup method according to claim 9, wherein the control instruction for setting up a path at a scheduled date and time includes: a scheduled date and time when the path is intended to be established; and a scheduled date and time when the path is intended to be deleted.

11. The path setup method according to claim 9, wherein the control instruction for path setup at a scheduled date and time is made through GMPLS including RSVP-TE and OSPF-TE protocols further comprising:

a protocol processing step of processing the GMPLS protocols and of transmitting and receiving a message based on the RSVP-TE including information on the scheduled date and time.

12. The path setup method according to claim 11, wherein, the protocol processing step further comprises a step of advertising, before message arrives at the scheduled date and time, a link information update message based on the OSPF-TE corresponding to the path setup at the scheduled date and time.

13. The path setup method according to claim 11, wherein, the protocol processing step further comprises:

a step of transmitting and receiving a link update message based on the OSPF-TE including a link-information scheduled date and time corresponding to the scheduled date and time; and a step of applying, when the link-information scheduled date and time arrives, the link update message to route calculation after the link-information scheduled date and time.

14. The path setup method according to claim 11, wherein the protocol processing step further comprises a step of exchanging, when a path is set up at the scheduled date and time, a path setup execution message with other NEs on a route of the path.

15. The path setup method according to claim 9, wherein, when a failure occurs and when a configuration/components change of the NE is made:

the first checking step further comprises a step of checking if the resources of the NE are applicable to path setup at a scheduled date and time, the path setup corresponding to the control instruction; and the second checking step further comprises a step of checking if the resources of the NE are applicable, and a step of generating, before the scheduled date and time, an alarm with respect to the path setup at the scheduled date and time corresponding to the control instruction.

16. The path setup method according to claim 15, wherein, in a case where protection is set for the path setup at a scheduled date and time, when a failure occurs and when a configuration/components change of the NE is made, the controlling step further comprises a step of performing a control corresponding to a state where the protection is implemented.

* * * * *

UNITED STATES PATENT AND TRADEMARK OFFICE
CERTIFICATE OF CORRECTION

| | |
|---|---|
| PATENT NO. | : 7,616,581 B2 |
| APPLICATION NO. | : 11/240603 |
| DATED | : November 10, 2009 |
| INVENTOR(S) | : Kenichi Shiozawa |

It is certified that error appears in the above-identified patent and that said Letters Patent is hereby corrected as shown below:

Column 4, Line 51 reads as follows:

When no trouble has occurred in the static check, then the

Please replace Column 4, Line 51 with:

When a trouble has occurred in the static check, then the

Signed and Sealed this

Fifteenth Day of June, 2010

David J. Kappos
*Director of the United States Patent and Trademark Office*